(12) United States Patent
Sibona et al.

(10) Patent No.: US 9,038,686 B2
(45) Date of Patent: May 26, 2015

(54) POSITIONING SYSTEM OF SECTORS OF A DEVICE FOR PRODUCING AN AIRPLANE FUSELAGE

(71) Applicant: Alenia Aermacchi S.p.A., Venegono Superiore (IT)

(72) Inventors: Guido Sibona, Rosta (IT); Ettore Mostarda, Corsano (IT); Giuseppe Iovine, Naples (IT)

(73) Assignee: Alenia Aermacchi S.p.A., Venegono Superiore (IT)

( * ) Notice: Subject to any disclaimer, the term of this patent is extended or adjusted under 35 U.S.C. 154(b) by 286 days.

(21) Appl. No.: 13/853,133

(22) Filed: Mar. 29, 2013

(65) Prior Publication Data

US 2013/0292059 A1    Nov. 7, 2013

(30) Foreign Application Priority Data

Mar. 30, 2012    (IT) .............................. TO2012A0287

(51) Int. Cl.
*B64C 1/00*    (2006.01)
*B29D 99/00*    (2010.01)
*B29C 53/82*    (2006.01)

(52) U.S. Cl.
CPC ....... *B29D 99/001* (2013.01); *B64C 2001/0072* (2013.01); *B29C 53/824* (2013.01); *Y02T 50/433* (2013.01)

(58) Field of Classification Search
CPC ............... B64C 2001/0054; B64C 2001/0072; B29C 53/824; B29C 33/485
See application file for complete search history.

(56) References Cited

U.S. PATENT DOCUMENTS

| 1,835,986 | A | 12/1931 | Heston |
| 4,278,490 | A | 7/1981 | Pistole |
| 7,597,772 | B2 * | 10/2009 | Martinez Cerezo et al. . 156/169 |
| 8,511,359 | B2 * | 8/2013 | Perlman ........................ 156/415 |
| 8,876,514 | B2 * | 11/2014 | Sana et al. .................... 425/179 |
| 2006/0145049 | A1 * | 7/2006 | Blankinship ................. 249/66.1 |
| 2010/0135754 | A1 | 6/2010 | Weber |
| 2013/0117983 | A1 * | 5/2013 | Sana et al. .................... 29/407.1 |

FOREIGN PATENT DOCUMENTS

| EP | 2572852 B1 * | 1/2014 |
| FR | 2595068 A1 * | 9/1987 |
| WO | WO 2007 148301 | 12/2007 |

* cited by examiner

*Primary Examiner* — Jeff Aftergut
(74) *Attorney, Agent, or Firm* — Gottlieb, Rackman & Reisman, P.C.

(57) ABSTRACT

Positioning system of sectors of a device for producing an airplane fuselage in which a lamination mandrel comprises a plurality of sectors borne by a supporting structure and mobile along guides between: an expanded lamination position and a contracted disassembling position. Each guide comprises a fixed part borne by the supporting structure and a mobile part sliding along/with respect to the fixed part in a rectilinear direction H. Between a portion of each mobile part facing towards the respective sector and a stiffening structure of the sector a positioning device is provided which allows adjustment of the position of the sector with respect to the guide in two directions which lie in a plane RP perpendicular to the axis H of the guide.

6 Claims, 5 Drawing Sheets

POSITIONING SYSTEM OF SECTORS OF A DEVICE FOR PRODUCING AN AIRPLANE FUSELAGE

The present invention concerns a positioning system of sectors of a device for producing an airplane fuselage.

BACKGROUND OF THE INVENTION

The patent application PCT WO 2007/148301 describes a device for producing an airplane fuselage in which a lamination mandrel is delimited by an external surface which defines a rotation solid (in particular a cylinder) with respect to a symmetry axis. The lamination mandrel is adapted to receive and support a band of impregnated synthetic material, which is wound and deposited on the external surface of the mandrel in a lamination phase forming a plurality of overlapped layers. Said overlapped layers are subjected to a subsequent polymerisation process under vacuum in an autoclave at high temperature for forming a structural section of the airplane (typically a tubular portion of fuselage).

The lamination mandrel comprises a plurality of sectors angularly spaced about the axis and borne by guides which extend radially from a grid supporting structure. The sectors are mobile between: an expanded lamination position in which the sectors have greater rectilinear edges parallel to the axis arranged side by side and the external surfaces of the sectors opposite the axis define the external surface; and a contracted disassembling position in which the sectors approach the axis moving away from the trace of the surface to allow extraction of the lamination mandrel from the structural section of the airplane at the end of the polymerisation process under vacuum.

In the systems of known type, each sector is provided with a supporting structure which is rigidly connected to a plurality of mobile slides which move along the respective fixed portions of the guides borne by the supporting structure.

Said systems do not allow any relative positioning of the sector with respect to the guides; said operation would be extremely useful fir the purpose of recovering any dimensional tolerances/positioning errors of the sector and/or of the guides.

The need is therefore felt to produce a positioning system of sectors which solves the technical problem highlighted above.

SUMMARY OF THE INVENTION

The preceding object is achieved by the present invention which relates to a positioning system of sectors of a device for producing an airplane fuselage in which a lamination mandrel is delimited by an external surface which defines a rotation solid with respect to a symmetry axis; said lamination mandrel is adapted to receive and support a band of impregnated synthetic material which is deposited and wound on the external surface forming a plurality of overlapping layers which are subjected to a polymerisation process under vacuum at high temperature for forming a structural section of the airplane; the lamination mandrel comprises a plurality of sectors borne by a supporting structure elongated along said axis, angularly spaced about the axis and mobile along guides borne by the supporting structure under the thrust of an actuator between: —an expanded lamination position in which the sectors have greater rectilinear edges parallel to the axis arranged side by side and the external surfaces of the sectors opposite the axis define together said external surface; and—a contracted disassembling position in which at least part of said sectors approaches the axis moving away from the trace of the surface to reduce the radial dimensions of the mandrel and allow extraction of the mandrel from the structural section of the airplane; each guide comprises a fixed part borne by said supporting structure and a mobile part which runs along/with respect to the fixed part in a rectilinear direction H, characterised in that between a portion of each mobile part facing towards the respective sector, the stiffening structure is provided with a positioning device (P) which allows adjustment of the position of the sector with respect to the guide in two directions (x,y) which lie in a plane RP perpendicular to the axis H of the guide.

BRIEF DESCRIPTION OF THE DRAWINGS

The invention will now be illustrated with reference to the accompanying figures which show a preferred embodiment example in which.

DETAILED DESCRIPTION OF THE INVENTION

Figure 1:
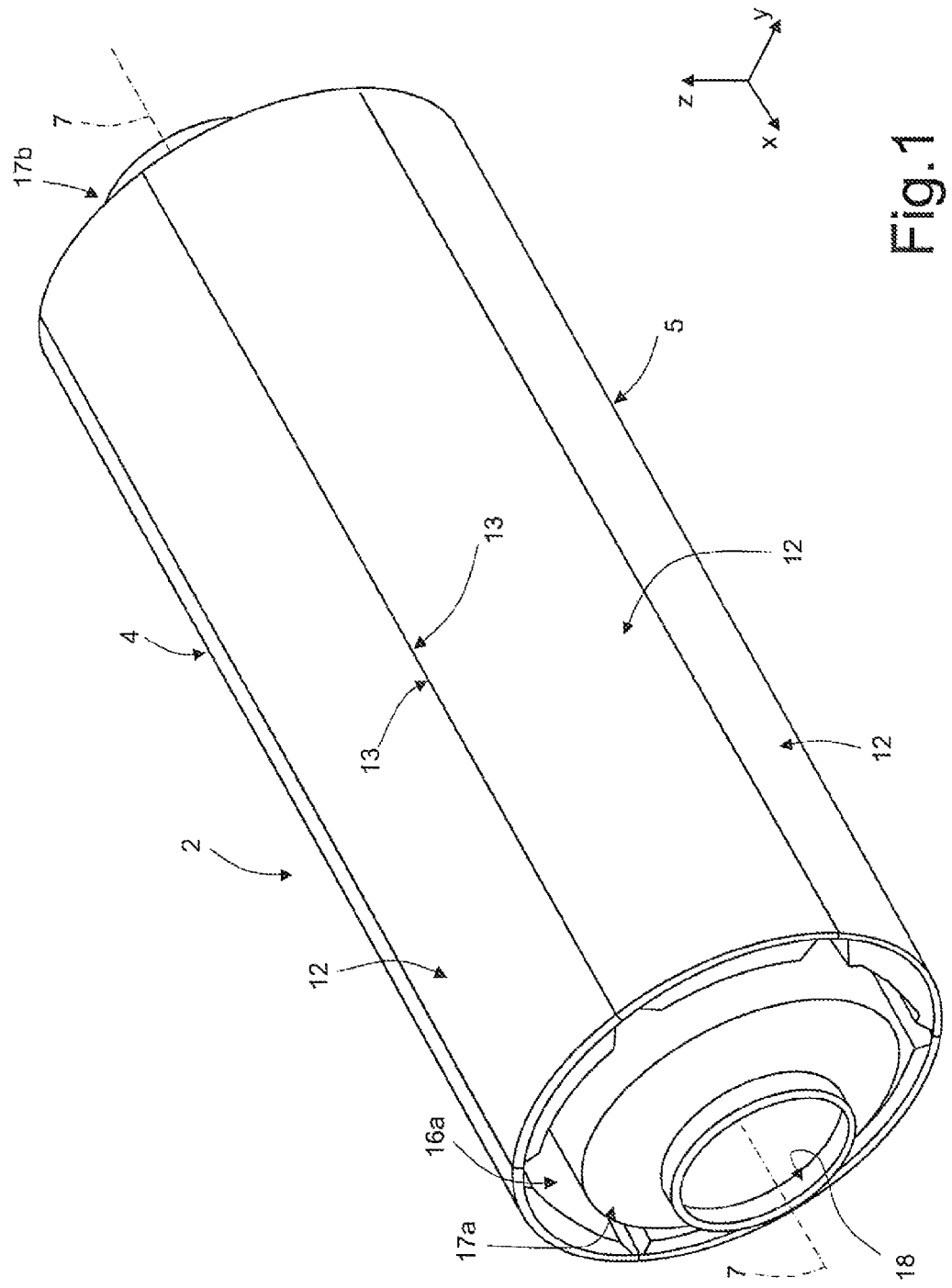
FIG. 1 illustrates—in a perspective view—a device for producing an airplane fuselage which uses an actuation system according to the invention.
Figure 4:
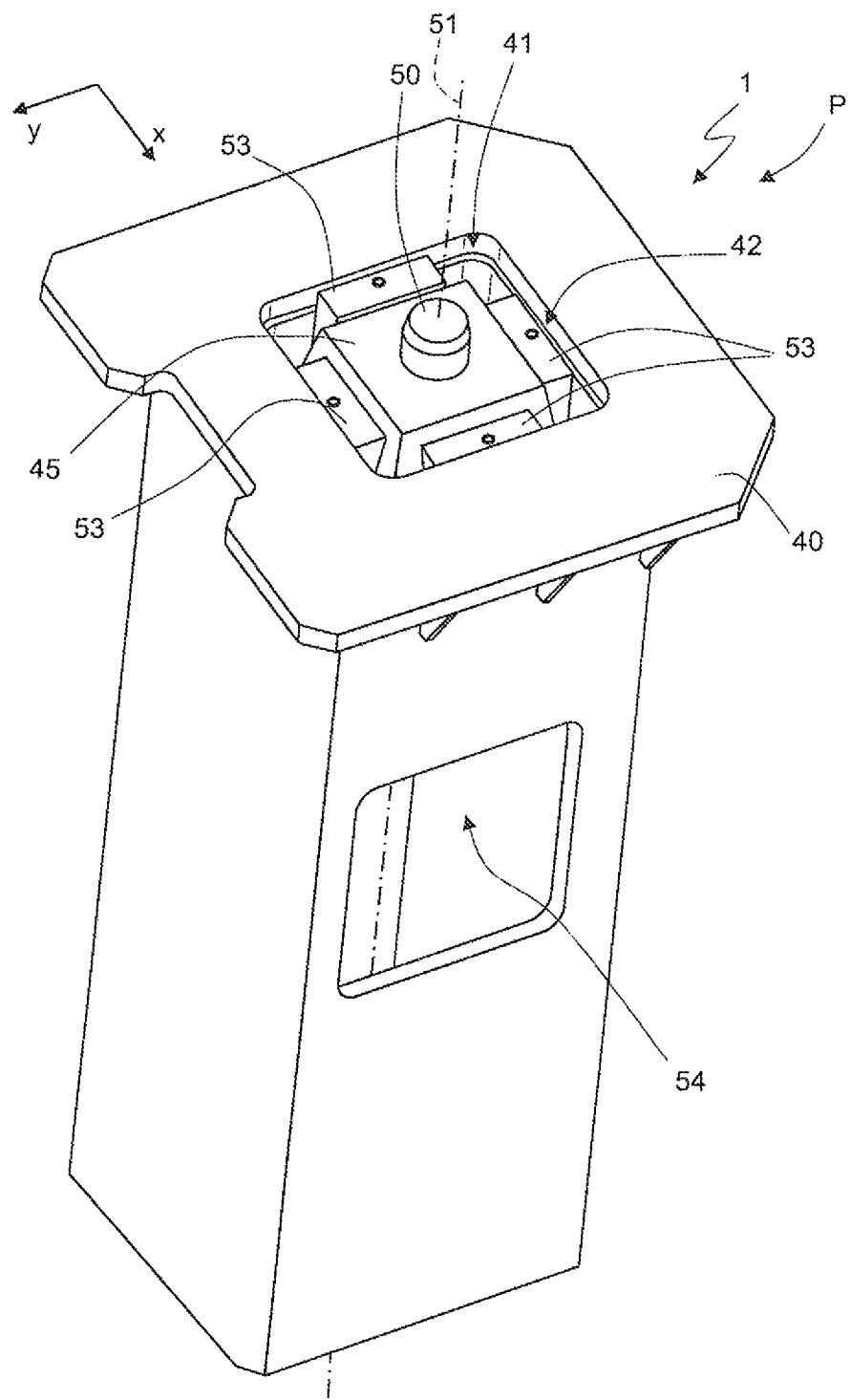
FIG. 4 illustrates in a perspective view the positioning device according to the present invention.
Figure 5:
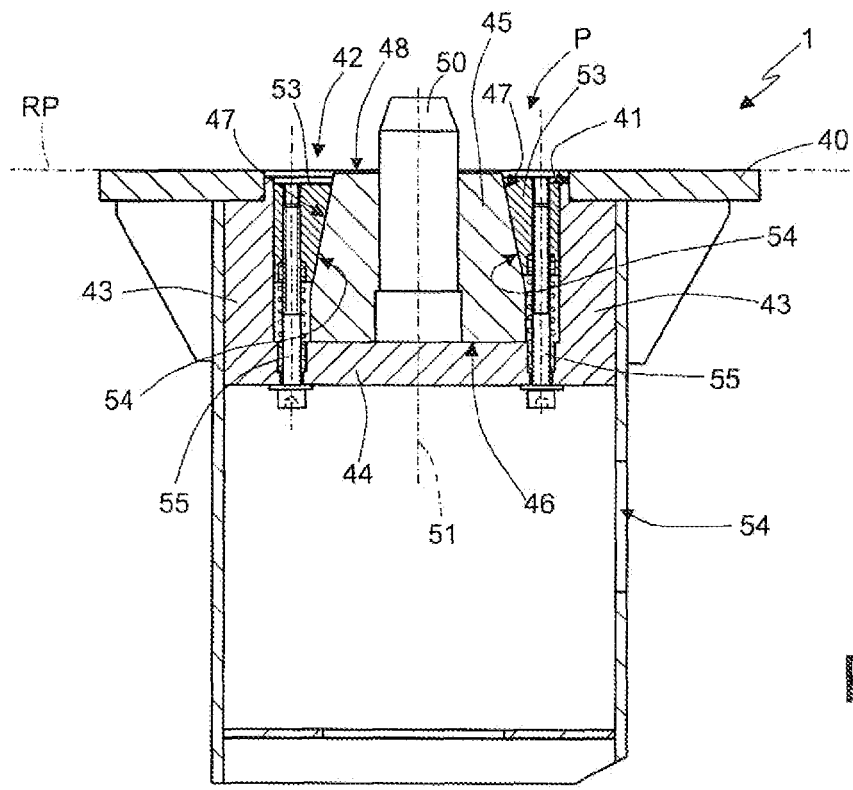
FIG. 5 illustrates in longitudinal section the operative positioning device of FIG. 4.
Figure 6:
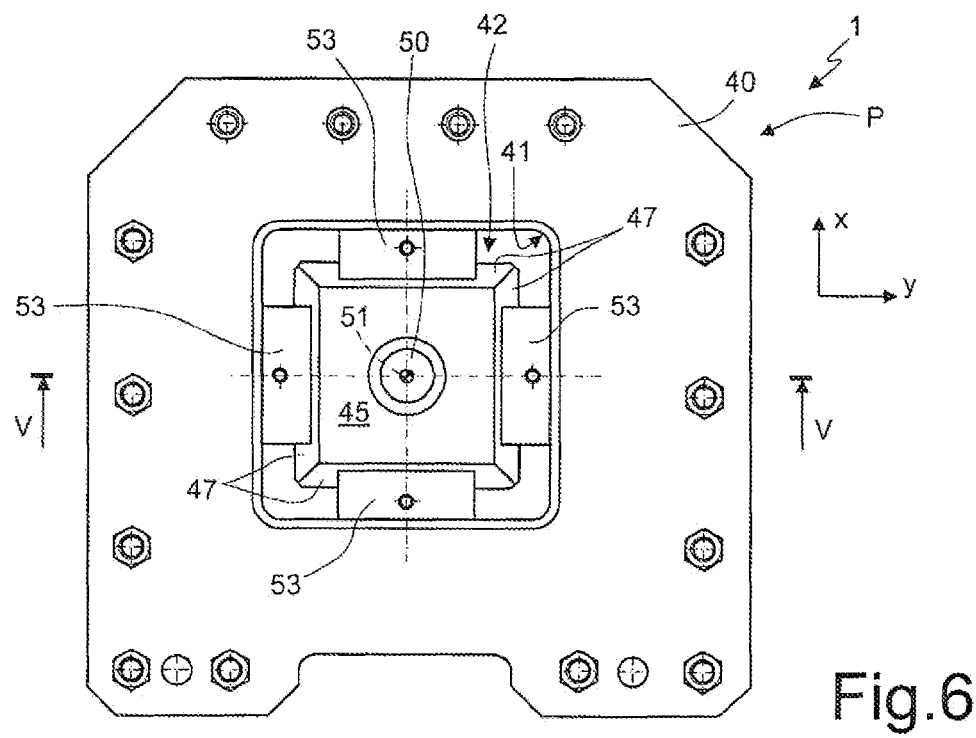
FIG. 6 illustrates, in an overhead view, the positioning device according to the present invention.

In FIGS. 4, 5 and 6 the reference number 1, as a whole, indicates a positioning system of sectors of a device 2 (FIG. 1) for producing an airplane fuselage.

In particular the device 2 (FIG. 1) comprises a lamination mandrel 4 delimited by an external surface 5 which defines a rotation solid with respect to a symmetry axis 7. The lamination mandrel 4 is adapted to receive and support a band of impregnated synthetic material which is deposited and wound on the external surface 5 forming a plurality of overlapped layers which completely and uniformly cover the surface 5. The band of synthetic material (for example carbon fibre) is deposited by a lamination head (of known type—not illustrated) on the lamination mandrel 4.

For example, the band can be deposited by causing rotation of the mandrel 4 about the axis 7 and translation in a coordinated manner of the lamination head (not illustrated) along the axis 7. For example, the patent application US2005/0039843 illustrates a lamination head. At the end of lamination of the band, the band of impregnated composite material is subjected to a polymerisation process under a vacuum for producing a tubular structural section of the airplane. Said process is performed by placing the lamination mandrel 4 in an autoclave (not illustrated) and running a thermal heating cycle of known type.

In the example shown, the external surface 5 is cylindrical and the lamination mandrel 4 is used for forming a cylindrical tubular portion of the airplane fuselage.

Figure 2:
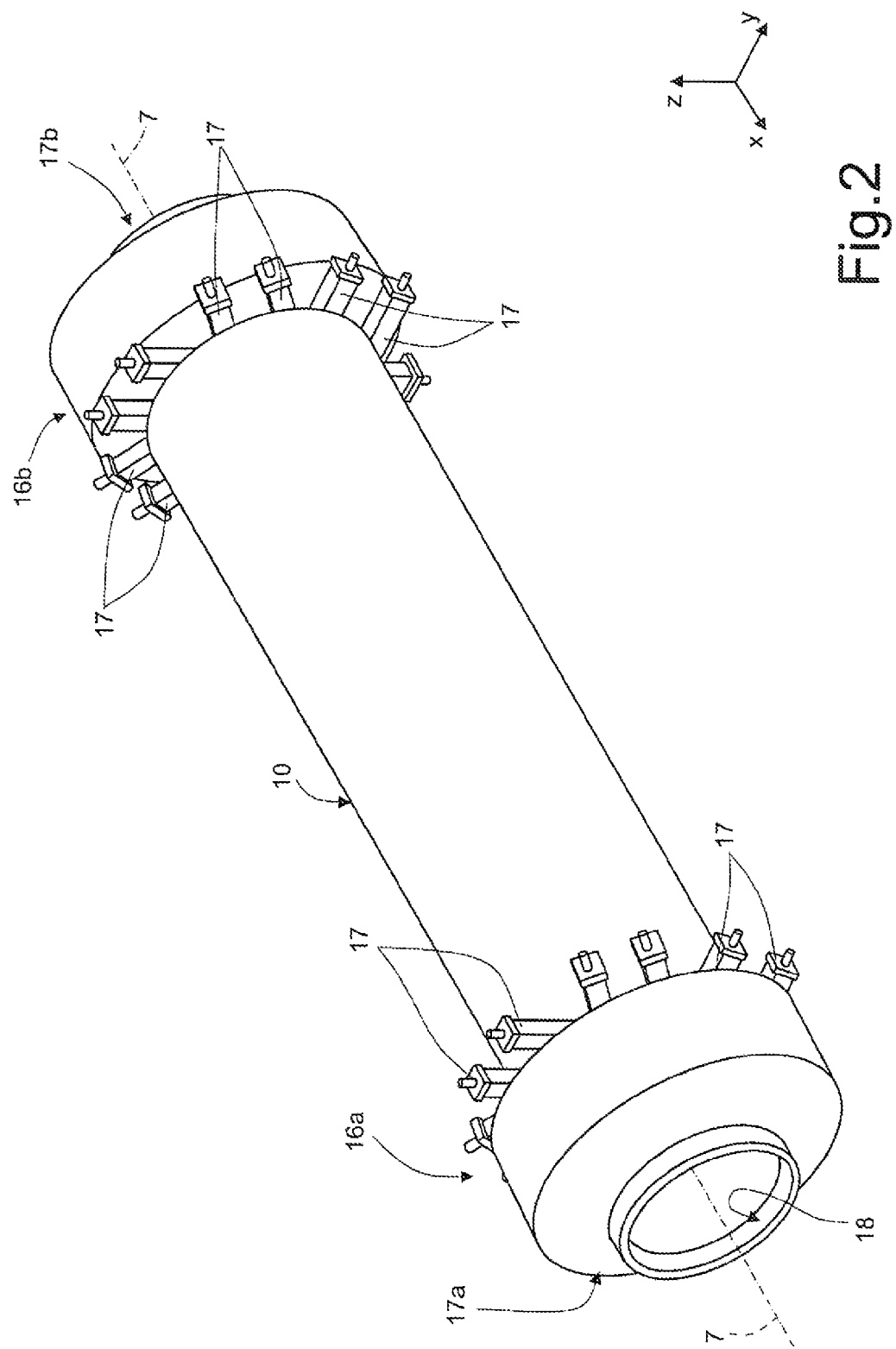
FIG. 2 illustrates—in a perspective view—the internal, structure of the device illustrated in FIG. 1.

The lamination mandrel 4 comprises a plurality of sectors 12 angularly spaced about the axis 7 and borne by a supporting structure 10 (FIG. 2) which extends linearly along the axis 7.

The sectors 12 are mobile between:

an expanded lamination position (FIGS. 1 and 3) in which the sectors 12 have greater rectilinear edges 13 parallel to the axis 7 arranged side by side and the external surfaces of the sectors 12 opposite the axis 7 are contiguous and define—as a whole—the cylindrical surface 5; and a contracted disassembling position (not illustrated) in which the sectors 12 approach the axis 7 moving away from the trace of the surface 5 to reduce the radial dimensions of the mandrel 4 and allow extraction of the mandrel 4 from the structural section of the airplane at the end of the process.

The (FIG. 2) supporting structure 10 is produced by means of known techniques adapted to prevent the deflection thereof along the axis 7.

The supporting structure 10 extends between a first and a second annular end portion 16a, 16b (FIG. 1) each of which is provided with a respective portion of frustoconical shape 17a, 17b which extends axially.

The frustoconical end portions 17a, 17b are made of metallic material and each delimit a central opening 18 coaxial with the axis 7.

The patent application WO 2007/148301 provides an example of embodiment and use of a supporting structure 10 of the type mentioned above and end portions 17a, 17b.

Each sector 12 comprises a curved metallic wall 20 (FIG. 3) which in cross section has the profile of an arc of a circle with aperture of 60° and centre in the axis 7 and a stiffening structure 21 formed of a plurality of ribs 21 spaced axially from one another and facing towards the inside of the mandrel 4 to prevent deflections/deformations of the wall 20 ensuring that the surface 5 remains perfectly cylindrical and coaxial with the axis 7.

Figure 3:
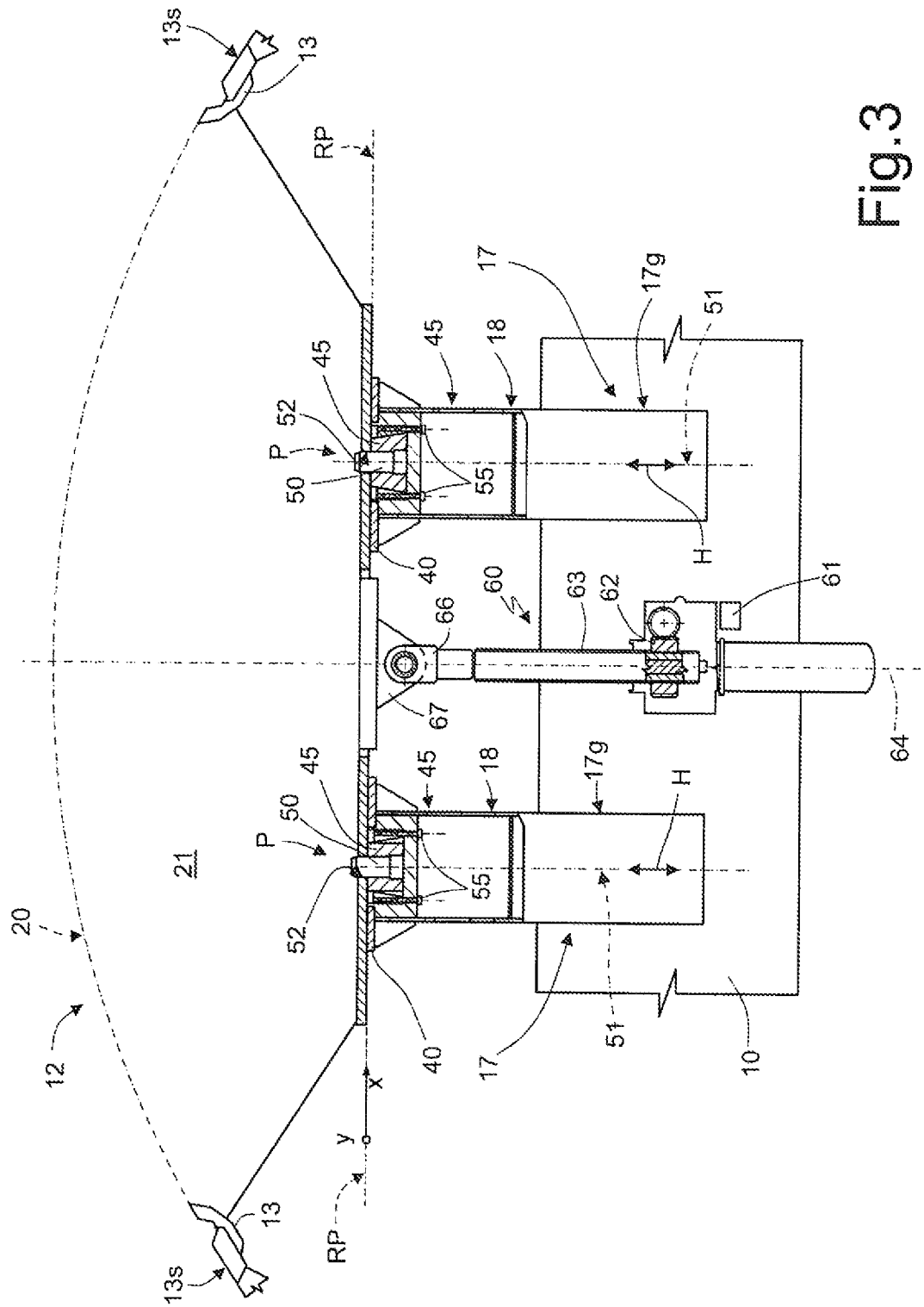
FIG. 3 illustrates in lateral view and on en enlarged scale a cross section of the device illustrated in FIGS. 1 and 2.

The adjacent edges 13 of two contiguous sectors 12 are adapted to position themselves one above the other in a peripheral overlapping region 13s (FIG. 3).

Between the stiffening structure 21 of each sector 12 and the supporting structure 10, a pair of rectilinear guides 17 (of known type and therefore not further illustrated) is provided, adapted to support the sector 12 and allow a linear translation movement, in a radial direction with respect to the axis 7 and in opposite directions, of each curved wall 20 between the expanded and contracted lamination positions.

In particular each sector 12 is supported by two pairs of rectilinear guides 17 (see FIG. 2) arranged at the annular end portions 16a, 16b of the supporting structure 10.

The guides 17—of known type—are not further detailed and each comprise a fixed part 17g borne by the supporting structure and a mobile part 18 (slide—see FIGS. 3 and 4) running along/with respect to the fixed part 17g in a rectilinear direction H.

According to the present invention, between an end portion of each mobile part 18 facing towards the stiffening structure 21 of the sector 12 a positioning device P is provided which allows adjustment of the position of the sector 12 with respect to the guide in a plane RP (outlined in FIG. 3) perpendicular to the axis H of the guide 17.

In further detail (FIG. 4), the slide 18 comprises a metallic body 45 of parallelepipedal shape provided, on the side facing towards the sector 12, with a flange 40 shaped in the form of a flat square frame delimiting a square internal opening 41 communicating with a seat 42 provided in the slide 18.

The seat 42 has a parallelepipedal shape and is delimited by four flat rectangular lateral walls 43 and by a bottom wall 44 (FIG. 5) also flat and rectangular.

The seat 42 houses a metallic body 45 shaped as a frustum of pyramid delimited by a longer base wall 46 resting on the bottom well 44, four peripheral walls 47 shaped in the form of an isosceles trapezium each facing a respective lateral wall 43 and a shorter base wall 48. The metallic body 45 bears a cylindrical metallic pin 50 which extends from the shorter base wall 48 towards the supporting structure 21 along an axis perpendicular to the walls 46 and 48. The axis 51 is perpendicular to the plane RP.

The pin 50 is adapted for insertion in a hole 52 (FIG. 3) provided in the supporting structure 21 of the sector 12.

The position of the body 45 inside the seat 42 can be adjusted by means of four catch bodies 53 housed inside the seat 42; in particular each catch body 53 is shaped in the form of a wedge with rectangular trapezium section and has a flat wall 54 inclined with respect to the axis 51 and abutting on a respective peripheral wall 47 of the metallic body 45. The position along the axis 51 of each catch body 53 can be adjusted by means of a screw 55 having a threaded stem screwed inside a cylindrical seat provided in the catch body 53 and a head abutting on the bottom wall 44 on the side opposite the one defining the seat 42.

The heads of the screws 55 (provided with a hexagonal seat) are accessible by means of a window 54 obtained in a wall of the slide 18.

An operator (not illustrated) 55 can adjust the position of each catch body 53 within the seat 42 and along the axis 51 by means of the screws; in this way, thanks to the coupling between the walls 54 and 47, the movement of the pin 50 is obtained in two directions x and y (FIG. 4) which pass through the plane RP perpendicular to the axis 51 and parallel to the plane of the flange 40. In this way, by means of pairs of positioning devices P (or all four positioning devices) it is possible to adjust the position of the sector 12 with respect to the four guides 17 that support it. Once an optimal position has been reached, the supporting structure 12 is securely fixed to the slide 18 by means of bolts 55 (FIG. 6) borne by the flange 40.

The movement of each sector is obtained by an actuator 60 (FIG. 3) positioned between the pair of guides 17 and provided with an electric motor 61 (FIG. 3, shown schematically) configured to produce the above-mentioned translation movement.

For example, the actuator 60 is of the screw—nut screw type and comprises a nut screw 62 borne by the supporting structure 10 and rotated by the motor 61 (for the sake of simplicity of illustration, in FIG. 3 the transmission is not illustrated) and a rectilinear threaded element 63 coupled with the nut screw 62 and having one end hinged to the stiffening structure 21 of a sector 12. The rectilinear threaded element 63 extends in a radial direction along an axis 64 parallel to the axes H.

Alternatively the nut screw 62 could be arranged on the stiffening structure 21 of a sector 12 and the threaded element 63 could be borne by the supporting structure 10.

The shaft 60 has a first end portion from which a rectangular plate 66 extends which in turn is hinged to a triangular bracket 67 extending radially from the stiffening structure 21 towards the axis 7.

The invention claimed is:
1. A positioning system configured to operate with sectors of a device (2) for producing an airplane fuselage in which a lamination mandrel (4) is defined by an external surface (5) which defines a rotation solid with respect to a symmetry axis (7); said lamination mandrel (4) is adapted to receive and support a band of impregnated synthetic material which is deposited and wound on the external surface (5) forming a plurality of overlapping layers which are subjected to a high temperature polymerisation process under vacuum for forming a structural section of the airplane;

the lamination mandrel (4) comprises a plurality of sectors (12) borne by a support structure which is elongated along said axis (7), angularly spaced about the axis (7) and mobile along guides (17) borne by the support structure (10) under the thrust of an actuator (60) between:

an expanded lamination position in which the sectors (12) have greater rectilinear edges (13) parallel to the axis (7) and arranged side by side and the external surfaces of the sectors (12) opposite to the axis (7) define together said external surface (5); and a contracted disassembling position in which at least part of said sectors (12) approaches the axis (7) moving away from the trace of the surface (5) to reduce the radial dimensions of the mandrel and allow the extraction of the mandrel itself (4) from the structural section of the airplane;

each guide (17) comprises a fixed part (17*g*) borne by said support structure (10) and a mobile part (18) which slides along/with respect to the fixed part (17*g*) along a rectilinear direction H, characterised by comprising a positioning device (P) arranged between a portion of each mobile part (18) facing the respective sector (12) and a stiffening structure (21) of a sector (12); said, positioning device (P) allowing the adjustment of the position of the sector (12) with respect to the guide along two directions (x, y) which lie in a plane RP perpendicular to the axis H of the guide (17) itself; said positioning device comprises a central body (45) arranged in a seat (42) obtained in said mobile part (18) and provided with a portion (51) which couples (52) with the support structure (21) of said sector (12);

the position of said central body (45) within said seat (42) being adjustable by positioning within said seat (42) a plurality of catch bodies (53) which abut on side walls (47) of said central body (45) to displace it.

2. System according to claim 1, wherein each sector (12) is supported by two pairs of rectilinear guides (17) arranged at end portions (16*a*, 16*b*) of the support structure.

3. System according to claim 1, wherein said central body (45) is shaped as a frustum of pyramid with square bases and said catch bodies (53) are wedge-shaped.

4. System according to claim 1, wherein each catch body (53) may be positioned within said seat (42) acting on a respective threaded element (55) which extends at least partially in a cavity obtained in the catch body itself.

5. System according to claim 1, wherein said actuator is of the screw (31)-nut screw (29) type.

6. System according to claim 1, wherein each sector (12) comprises a curved wall (20) which has a cross section with the profile of an arc of a circle and a stiffening structure (21) facing inwardly of the mandrel (4) and adapted to prevent deflections/deformations of the wall (20).

* * * * *